United States Patent
Nakayama

(10) Patent No.: US 9,905,832 B2
(45) Date of Patent: Feb. 27, 2018

(54) BATTERY WIRING MODULE

(75) Inventor: Osamu Nakayama, Yokkaichi (JP)

(73) Assignees: AUTONETWORKS TECHNOLOGIES, LTD., Mie (JP); SUMITOMO WIRING SYSTEMS, LIMITED, Mie (JP); SUMITOMO ELECTRIC INDUSTRIES, LIMITED, Osaka (JP)

( * ) Notice: Subject to any disclaimer, the term of this patent is extended or adjusted under 35 U.S.C. 154(b) by 398 days.

(21) Appl. No.: 14/425,491

(22) PCT Filed: Sep. 3, 2012

(86) PCT No.: PCT/JP2012/072344
§ 371 (c)(1),
(2), (4) Date: May 8, 2015

(87) PCT Pub. No.: WO2014/033950
PCT Pub. Date: Mar. 6, 2014

(65) Prior Publication Data
US 2015/0357620 A1     Dec. 10, 2015

(51) Int. Cl.
*H01M 2/20* (2006.01)
*H01M 10/48* (2006.01)
*H01M 2/34* (2006.01)

(52) U.S. Cl.
CPC ............ *H01M 2/206* (2013.01); *H01M 2/34* (2013.01); *H01M 10/482* (2013.01); *H01M 2/204* (2013.01); *H01M 2220/20* (2013.01)

(58) Field of Classification Search
CPC ....... H01M 2/206; H01M 2/34; H01M 10/482
See application file for complete search history.

(56) References Cited

U.S. PATENT DOCUMENTS

| 4,467,017 A | * | 8/1984 | Jackson | ............. | G01R 31/3665 |
| | | | | | 429/9 |
| 5,804,770 A | * | 9/1998 | Tanaka | .................. | H01M 2/206 |
| | | | | | 174/138 F |

(Continued)

FOREIGN PATENT DOCUMENTS

EP     0 063 032 A2    10/1982
EP     2 698 845 A1     2/2014

(Continued)

OTHER PUBLICATIONS

Aug. 25, 2014 International Preliminary Report on Patentability issued in International Application No. PCT/JP2012/072344.
Jul. 23, 2015 Extended European Search Report issued in International Application No. 12883643.4.

(Continued)

*Primary Examiner* — Ula C Ruddock
*Assistant Examiner* — Matthew W Van Oudenaren
(74) *Attorney, Agent, or Firm* — Oliff PLC

(57) ABSTRACT

Provided is a battery wiring module to be attached to a single cell group in which a plurality of single cells each having a positive electrode section and a negative electrode section are lined up, and to connect the electrode sections. The battery wiring module includes a connecting member configured to connect the electrode sections, and a protector by which the connecting member is held. The protector has a positioning section that is fitted to positioned sections formed in a single cell prior to the connecting member reaching the electrode sections when the battery wiring module is attached to the single cells. The positioning section is provided projecting farther to the single cell side than the connecting member.

7 Claims, 10 Drawing Sheets

(56) References Cited

U.S. PATENT DOCUMENTS

| | | | | |
|---|---|---|---|---|
| 6,152,776 A | * | 11/2000 | Ikeda | .................. H01M 2/1077 429/121 |
| 6,261,719 B1 | | 7/2001 | Ikeda et al. | |
| 2010/0073005 A1 | | 3/2010 | Yano et al. | |
| 2010/0288532 A1 | * | 11/2010 | Ikeda | .................. H01R 31/085 174/133 B |
| 2012/0306474 A1 | * | 12/2012 | Ikeda | .................. H01M 2/1077 324/72 |
| 2012/0322320 A1 | | 12/2012 | Takase et al. | |

FOREIGN PATENT DOCUMENTS

| | | |
|---|---|---|
| JP | H09-237617 A | 9/1997 |
| JP | 2000-100417 A | 4/2000 |
| JP | 2000-149909 A | 5/2000 |
| JP | 2003-157827 A | 5/2003 |
| JP | 2004-152706 A | 5/2004 |
| JP | 2011-086634 A | 4/2011 |
| JP | 2011-091003 A | 5/2011 |
| JP | 2011-171125 A | 9/2011 |
| JP | 2011-181402 A | 9/2011 |
| JP | 2012-028061 A | 2/2012 |
| JP | 2012-138333 A | 7/2012 |
| JP | 2012-186062 A | 9/2012 |
| WO | 12/029995 A1 | 3/2012 |
| WO | WO2012036317 * | 3/2012 |

OTHER PUBLICATIONS

Dec. 15, 2016 Office Action issued in European Patent Application No. 12 883 643.4.

* cited by examiner

BATTERY WIRING MODULE

TECHNICAL FIELD

The exemplary embodiments relate to a battery wiring module.

BACKGROUND ART

In battery modules for electric cars or hybrid cars, a plurality of single cells are lined up, each single cell being constituted by a flat main body in which a power generating element is provided, and positive and negative electrodes. The plurality of single cells is connected in series or in parallel to each other by electrodes of adjacent single cells that are connected by connecting members (busbars).

JP-A-2000-149909 discloses a battery wiring module that is configured such that a large number of busbars are incorporated into a substrate section made of a synthetic resin by insert molding. This battery wiring module is mounted to a single cell group, and single cells are connected to each other by inserting electrode bolts of the single cells through electrode holes formed in the busbars, and tightening the busbars with nuts.

SUMMARY

Technical Problem

In order to mount such a battery wiring module to a single cell group, electrode bolts of the single cells need to be inserted through connection holes formed in the busbars, and thus if it is desired to mount the battery wiring module rapidly, then it is necessary to align the connection holes of all the busbars with all the electrode bolts at once when mounting the battery wiring module.

However, it is actually difficult to align the positions of the connection holes of the busbars with the positions of the electrode bolts in the entire regions at once, due to a manufacturing error or assembling error caused by a dimension tolerance set for each single cell or the battery wiring module. Therefore, it is conventionally the case that troublesome procedures are required, that is, performing an operation of aligning a connection hole of each busbar with an electrode bolt of a single cell and then inserting the electrode bolt into the connection hole in a repeated manner, and then screwing nuts onto the electrode bolts.

The exemplary embodiment was made in view of the above-described circumstances, and it is an object of the exemplary embodiments to improve workability of assembling a battery wiring module.

Solution to Problem

The exemplary embodiments relate to a battery wiring module to be attached to a single cell group in which a plurality of single cells each having a positive electrode section and a negative electrode section are lined up, and to connect the electrode sections to each other, the battery wiring module comprising: connecting members configured to connect the electrode sections to each other; and a protector by which the connecting members are held, wherein the protector has a positioning section that is fitted to a positioned section formed in a single cell prior to the connecting members reaching positions to connect to the electrode sections when the battery wiring module is attached to the single cells, and the positioning section is provided projecting farther to the single cell side than the connecting members.

According to such a configuration, it is possible to improve workability of assembling the battery wiring module to the single cell group. In other words, it is possible to position the battery wiring module to the single cells at once using the positioning section and the positioned section, and then to connect the connecting members and the electrode sections to each other, eliminating the need to perform the troublesome operation of positioning each connecting member with respect to the corresponding electrode sections. Particularly, in the case where the number of the single cells constituting the single cell group is large, a significant improvement in work efficiency is possible. Furthermore, since the protector includes the positioning section, and grove positioning is performed by fitting in advance the positioning section to the positioned section and then connecting the electrode sections and the connecting members, it is not necessary to bring the connecting members and the electrode sections, for example, into contact with each other when performing attachment operation, making it possible to reduce the risk that the connecting members and the electrode sections are damaged, and the performance of the battery module deteriorates, for example.

Furthermore, by forming the positioned section on the same single cell as that of the electrode sections that need to be subjected to positioning, it is possible to reduce the error in assembling the connecting members to the electrode sections after the positioned section and the positioning section are fitted to each other, preventing deterioration in assembling workability that may be caused due to an increase in the error in assembling.

It is preferable that the positioning section is located at a position that is the closest to the single cell side when the battery wiring module is attached to the single cells. According to such a configuration, the battery wiring module can be configured such that the positioning section is first fitted to the positioned section when the battery wiring module is attached to the single cells, irrespective of the configuration of the single cells, and thus is excellent in versatility.

The positioning section may also be formed at a substantially central position of the protector in a direction that intersects with a direction in which the single cells are lined up. According to such a configuration, it is possible to reduce the error in assembling the protector to the single cells as compared with the case where the positioning sections is provided at, for example, any one end in the same direction, resulting in easier positioning of the connecting members and the electrode sections.

The protector may also have the positioning section for each of the single cells. According to such a configuration, it is possible to perform positioning for each single cell, suppressing an error in assembling the connecting members to the electrode sections to the minimum. That is, the closer the formation position of the positioning section to the connecting members to be positioned is, the more the error in assembling the connecting members to the electrode sections can be suppressed to be small. Therefore, by providing a positioning section for each single cell, which is a minimum unit, it is possible to suppress the assembling error and improve the assembling workability.

The positioned section may also be a voltage detecting electrode section that is provided between the positive electrode section and the negative electrode section of one single cell, and the positioning section may also have a shape of a recess into which the voltage detecting electrode section can be fitted. According to such a configuration, the distance from the positioned section to the positive electrode section can be made substantially equal to the distance from the positioned section to the negative electrode section, and thus an error in assembling each connecting member to electrode sections after the positioning section is fitted to the positioned section can be suppressed in a balanced manner, making it possible to improve the assembling workability.

Furthermore, by the voltage detecting electrode serving as the positioned section, the need to newly provide a positioned section on the single cell side is eliminated, making it possible to achieve excellent versatility and a reduction in cost. Additionally, since the voltage detecting electrode and the electrode sections are managed with respect to accuracy in size by the single cells, irrespective of the positioning section, it is not necessary to newly manage accuracy in size of the positioned section (separately from the voltage detecting electrode). Also, an error in assembling the connecting members to the electrode sections is further reduced by fitting the positioning section to the voltage detection electrode that has been subjected to the size accuracy management, allowing a further improvement in assembling workability.

The positioning section may also have, at a projecting end thereof, an inclined guide surface that is inclined so as to enlarge an internal space of the positioning section, the inclined guide surface being provided circumferentially. According to such a configuration, when the positioning section is fitted to the positioned section, the positioned section can easily be guided by the inclined guide surface. Therefore, by improving the workability of fitting the positioning section to the positioned section, it is possible to improve the workability of assembling the entire battery wiring module.

A configuration is also possible in which the connecting members connect adjacent electrode sections of the plurality of single cells, the protector includes a first unit that holds one side in a connection direction of each connecting member, and a second unit that holds the other side in the connection direction of the connecting member, and at least one of the first unit and the second unit is configured to be slidably movable with respect to the connecting members in the connection direction of the connecting members.

According to such a configuration, even when an assembling error occurs between the plurality of single cells and the battery wiring module that is assembled thereto, at least one of the first unit and the second unit is configured to be slidably movable with respect to connecting member in the connection direction of the connecting member, and thus it is possible to vary the relative position of the first unit and the second unit via the connecting member based on the positioned section of the counterpart single cell. Therefore, the error in assembling to the single cell can be eliminated on the battery wiring module side, and a defect in assembling the battery wiring module due to the dimensional error between both the components can be prevented.

A configuration is also possible in which the connecting member includes an engaged section, and at least one of the first unit and the second unit includes an engaging section that can engage with the engaged section in the connection direction with a predetermined clearance. According to such a configuration, when the positioning section is fitted to the positioned section, the connecting member can move slidably in the range of a predetermined clearance. Therefore, even when an error occurs in the dimension of the electrode sections, the connecting member can be moved in the connection direction in the range of a predetermined clear-ance, and thus it is possible to improve workability of assembling the connecting member to the electrode sections.

Advantageous Effects

According to the exemplary embodiment, it is possible to improve workability of assembling a battery wiring module.

DESCRIPTION OF EXEMPLARY EMBODIMENTS

Embodiments

Figure 1:
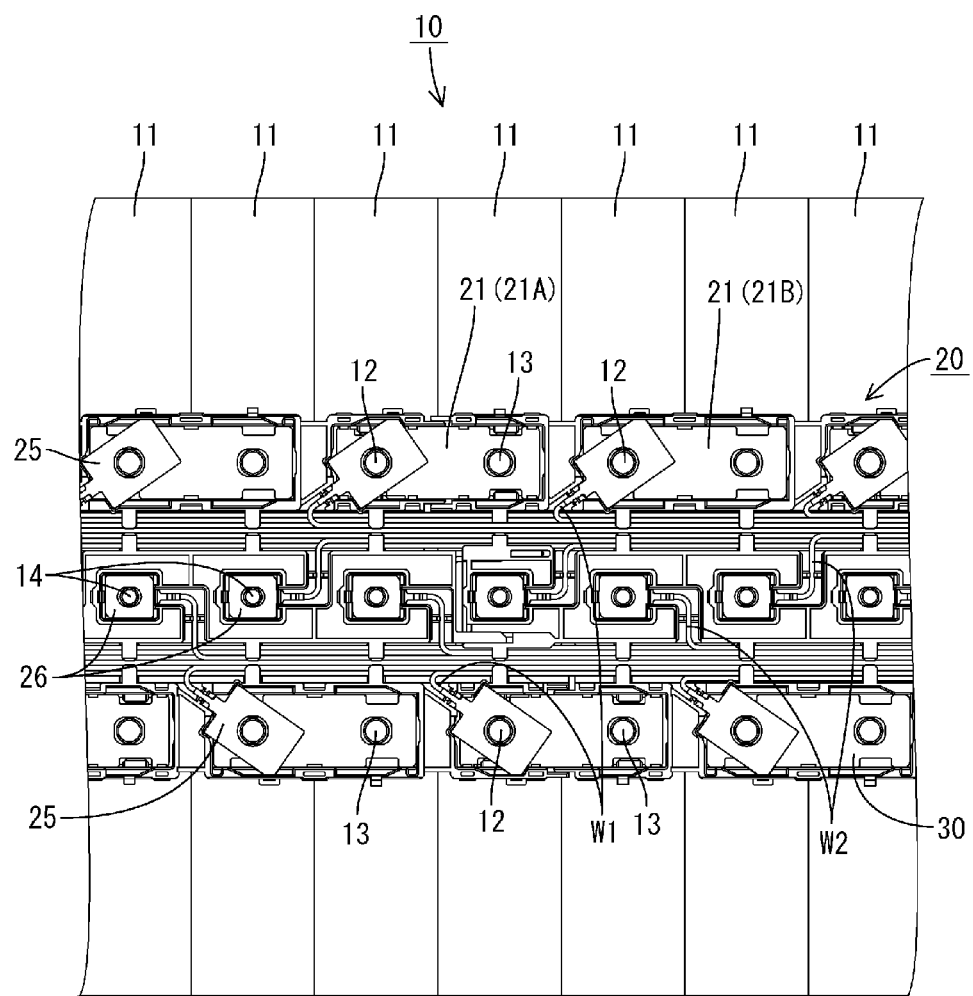
FIG. 1 is a plan view showing a battery module according to an exemplary embodiment.

An exemplary embodiment will be described with reference to FIGS. 1 to 10. As shown in FIG. 1, a battery wiring module 20 of the present embodiment is attached to a single cell group in which a plurality of single cells 11 are lined up, the battery wiring module 20 and the single cell group constituting a battery module 10. This battery module 10 is used as a driving source for driving a vehicle such as an electric car or hybrid car, for example. Hereinafter, description will be given assuming that the upper side of FIG. 1 is the front side, the lower side of FIG. 1 is the rear side, the right-left direction of FIG. 1 is the connection direction, the foreground of the drawing is the upper side, and the background of the drawing is the lower side.

Battery Module

As shown in FIG. 1, the battery module 10 includes the plurality of single cells 11 (that correspond to a single cell group) that are lined up laterally for example, and the battery wiring module 20 that is attached to the plurality of single cells 11.

Single Cell

Each single cell 11 includes a positive electrode section 12 and a negative electrode section 13, which are aligned in the front-rear direction and project from a predetermined surface (upper surface) of a main body having the shape of a rectangular parallelepiped in which a power generating element (not shown) is accommodated, and a voltage detecting electrode section 14, which is also provided projecting from the main body at a substantially intermediate position between the electrode sections 12 and 13. Each of the electrode sections 12, 13, and 14 is provided with a rectangular cylindrical nut (square nut) and has a screw hole that penetrates through the center thereof. The circumferential edges of the respective electrode sections excluding their upper and lower sections serve as electrode holding section 12A, 13A, and 14A, which are covered with insulating members made of a synthetic resin.

The single cells 11 are lined up laterally such that adjacent single cells 11 are directed in opposite front-rear directions, and thus adjacent electrode sections 12 and 13 are configured to have different polarities (the positive electrodes and the negative electrodes are arranged alternately in the direction in which the single cells 11 are lined up laterally). These plurality of single cells 11 are fixed to each other by a holding plate (not shown).

Battery Wiring Module

Figure 2:
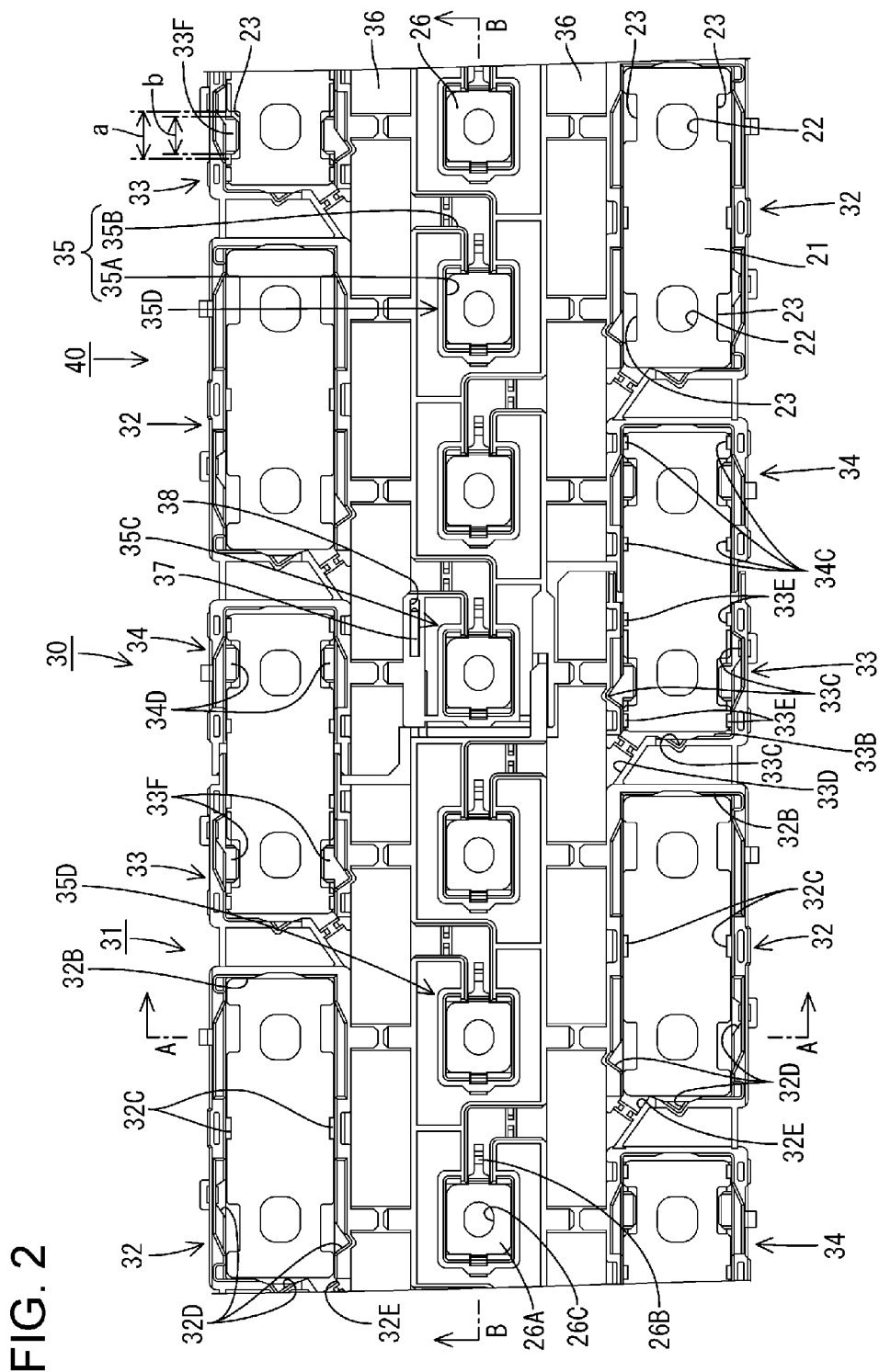
FIG. 2 is a plan view showing the state in which the battery wiring module is assembled.

As shown in FIGS. 1 and 2, the battery wiring module 20 includes a plurality of busbars 21 (that correspond to connecting members) for connecting the electrode sections 12 and 13 that are adjacent to each other in the horizontal direction, a plurality of voltage detection terminals 25 for detecting a voltage of a single cell 11, the respective voltage detection terminals 25 being overlapped on the busbars 21, a plurality of intermediate voltage detection terminals 26 for detecting a voltage of a single cell 11, the respective intermediate voltage detection terminals 26 being overlapped on the voltage detecting electrode sections 14, and a protector 30 that is made of a synthetic resin and accommodates the busbars 21 and the voltage detection terminals 25 and 26.

Busbar

Figure 3:
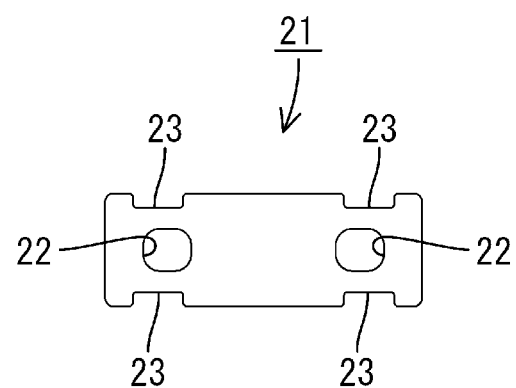
FIG. 3 is a plan view showing a busbar.

The busbar 21 is made of metal such as, for example, copper, copper alloy, stainless steel (SUS), or aluminum, and has, as shown in FIG. 3, the shape of a plate that has a length appropriate for the dimension between the adjacent electrode sections 12 and 13, and has a pair of through-holes 22, which communicate with the screw holes of the electrode sections 12 and 13. The shape of the through-holes 22 is oval and their longitudinal direction is the connection direction (the right-left direction of FIG. 3). Furthermore, cut-away portions, serving as engaged recess sections 23, are formed on the side edges in the connection direction of the busbar 21 at positions in front of and behind the through-holes 22.

As shown in FIG. 2, the busbars 21 are classified into connecting busbars 21A that connect a first unit 31 and a second unit 40, which are described in detail later, and accommodation busbars 21B that are each entirely accommodated in the first unit 31 or the second unit 40, depending on the position at which that busbar is accommodated. The connecting busbars 21A and the accommodation busbars 21B have the same shape that is shown in FIG. 3. Note that in the present embodiment, the engaged recess sections 23 of the connecting busbars 21A among the busbars 21 correspond to engaged sections.

Voltage Detection Terminal

The voltage detection terminals 25 and 26 detect a desired voltage of a single cell 11 by being electrically connected to the corresponding one of the electrode sections 12, 13, and 14, the voltage being detected with a pair of voltage detection terminals 25, or with a voltage detection terminal 25 and an intermediate voltage detection terminal 26. First, the voltage detection terminal 25 that is overlapped on the busbar 21, is described. The voltage detection terminal 25 includes an oblong flat plate section, and a crimp section that is provided projecting from the flat plate section, and a voltage detecting electrical wire W1 is crimped to the crimp section. The flat plate section has, in the center thereof, an oval insertion through-hole that communicates with the screw hole of the electrode section 12 and the corresponding through-hole 22.

On the other hand, as shown in FIGS. 1 and 2, the intermediate voltage detection terminal 26 that is overlapped on the voltage detecting electrode section 14 includes a rectangular flat plate section 26A, which is slightly smaller than the flat plate section of the above-described voltage detection terminal 25, and a crimp section 26B provided projecting from the flat plate section 26A, and a voltage detecting electrical wire W2 is crimped to the crimp section 26B. The flat plate section 26A has, in the center thereof, an oval insertion through-hole 26C that communicates with the screw hole of the voltage detecting electrode section 14.

The voltage detecting electrical wires W1 and W2 that are connected to the voltage detection terminals 25 and 26 are collected in an electrical wire routing groove 36, which will be described later, and are connected to a battery ECU (not shown) that is provided at a position on the right side of FIG. 1.

The battery ECU is an ECU on which a micro-computer, elements, and the like are mounted, and has a well-known configuration with functions to detect the voltage, current, temperature, and the like of the single cell 11 to perform, for example, monitoring and control of the single cell 11.

Protector

The protector 30 is configured by coupling the first unit 31 for holding one side in the connection direction (right-left direction) of each connecting busbar 21A, and the second unit 40 for holding the other side in the connection direction of the connecting busbar 21A, and further coupling a plurality of the coupled first unit 31 and second unit 40 to each other. That is, the protector 30 has a structure in which the plurality of first units 31 and second units 40 are alternately coupled to each other. Note that the first units 31 and the second units 40 have the same shape, but for the sake of convenience, a unit shown in the left side is referred to as the first unit 31 and a unit shown in the right side is referred to as the second unit 40. The first unit 31 is used for describing both the units, and the same reference numerals are given to the components corresponding to those of the second unit 40, and descriptions thereof are omitted.

Figure 4:
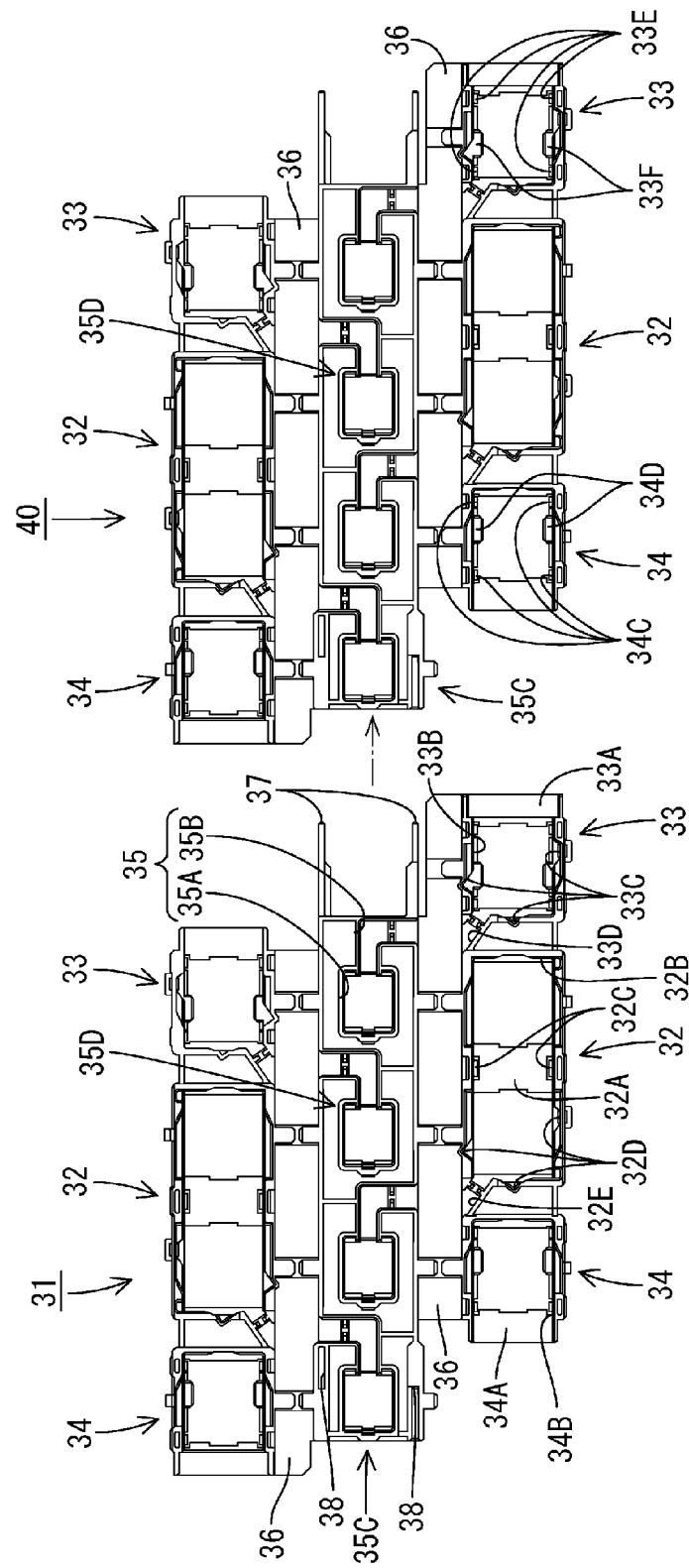
FIG. 4 is a plan view showing a first unit and a second unit that constitute a protector.

The first unit 31 is preferably made of a synthetic resin, and has, as shown in FIG. 4, a shape in which the right end edge thereof protrudes rightward from the front to the rear while forming steps, and the left end edge thereof protrudes leftward from the rear to the front while forming steps. This first unit 31 is provided with a pair of accommodating sections 32 for accommodating the accommodation busbars 21B and the voltage detection terminals 25, the pair of accommodating sections 32 being provided on both sides in the front-rear direction at substantially intermediate sections in the connection direction.

Coupling sections 33 that each hold one side of a connecting busbar 21A and accommodate a voltage detection terminal 25 overlapped thereon are provided to the right of the pair of accommodating sections 32. Similarly, coupled sections 34 that each hold the other side of the connecting busbar 21A held by the coupling section 33 of the second unit 40 are provided to the left of the pair of accommodating sections 32.

In the intermediate portion in the front-rear direction of the first unit 31, four intermediate accommodating sections 35 for accommodating intermediate voltage detection terminals 26 are lined up laterally. Furthermore, the electrical wire routing grooves 36 in which the voltage detecting electrical wires W1 and W2 connected to the voltage detection terminals 25 and 26 can be collected and routed to the battery ECU side are provided on both sides in the front-rear direction of the intermediate accommodating section 35, that is, between the intermediate accommodating sections 35 and the accommodating sections 32 or the coupling sections 33.

The components constituting the first unit 31 are described further in detail. Each accommodating section 32 includes a bottom plate 32A on which an accommodation busbar 21B is placed, and a rectangular cylindrical partition wall 32B that surrounds the accommodation busbar 21B. The bottom plate 32A has the shape of a band extending in the front-rear direction, and has a structure of connecting the lower ends of the partition wall 32B that are opposite to each other in the front-rear direction only at intermediate portions in the connection direction, so that the electrode sections 12 and 13 including the electrode holding sections 12A and 13A can be inserted into the accommodating section 32 from the lower side thereof. In other words, the accommodating section 32 has a pair of rectangular openings with the bottom plate 32A interposed therebetween.

As shown in FIGS. 2 and 4, this bottom plate 32A has, on the upper side thereof, a pair of lock pieces 32C for locking the accommodation busbar 21B that is fitted into the accommodating section 32 from the upper side thereof. The lock pieces 32C are formed by cutting in the partition wall 32B, and are elastic pieces that are deformable in the front-rear direction. The lock pieces 32C allow the accommodation busbar 21B to be inserted thereinto by elastically deforming in a manner of being pushed outward to the accommodating section 32 (partition wall 32B side) by the accommodation busbar 21B, and prevent the accommodation busbar 21B from disengaging upward by elastically recovering.

The accommodating section 32 has, on the left side of the substantially intermediate section in the connection direction thereof, an electrical wire through-groove 32E and terminal holding sections 32D for holding a voltage detection terminal 25 that is fitted onto the accommodation busbar 21B. The terminal holding sections 32D hold the flat plate section of the voltage detection terminal 25 in a position in which the flat plate section is inclined in the front-rear direction, so that the voltage detecting electrical wire W1 connected to the voltage detection terminal 25 can be led to the electrical wire routing groove 36. The terminal holding sections 32D are constituted by three recesses having a triangular shape seen in the plan view, and can prevent the flat plate section of the voltage detection terminal 25 from rotating by the corners of the flat plate section being fitted into the recesses. The electrical wire through-groove 32E leads the crimp section of the voltage detection terminal 25 and the voltage detecting electrical wire W1 that is crimped to the crimp section to the electrical wire routing groove 36, and is provided in the shape of a recess so as to communicate with the electrical wire routing groove 36 from the accommodating section 32.

Each coupling section 33 includes a bottom plate 33A on which a connecting busbar 21A is placed, when the coupling section 33 is coupled to a coupled section 34, in the state of being overlapped on (or below) the bottom plate 34A of the coupled section 34, and a partition wall 33B that surrounds three sides on the left side of the substantially intermediate portion of the connecting busbar 21A in a manner in which the one side is opened in the connection direction. Similarly to the accommodating section 32, this coupling section 33 is provided with an electrical wire through-groove 33D and terminal holding sections 33C for holding the voltage detection terminal 25 that is fitted onto the held connecting busbar 21A. The configurations of the electrical wire through-groove 33D and the terminal holding sections 33C are the same as those of the electrical wire through-groove 32E and the terminal holding sections 32D of the accommodating section 32, and descriptions thereof are omitted.

On the other hand, each coupled section 34 includes a bottom plate 34A on which a connecting busbar 21A is placed, when the coupled section 34 is coupled to a coupling section 33, in the state of being overlapped below (or on) the bottom plate 33A of the coupling section 33, and a partition wall 34B that surrounds three sides on the right side of the substantially intermediate portion of the connecting busbar 21A in a manner in which the one side is opened in the connection direction.

A plurality of pairs of holding pieces 33E and pairs of holding pieces 34C are provided projecting from the partition walls 33B and 34B that are located further inside in the connection direction than the respective bottom plates 33A and 34A. The holding pieces 33E and 34C are located on the upper side of the connecting busbar 21A that is inserted laterally from the open ends of the coupling section 33 and the coupled section 34, and have the function of holding the connecting busbar 21A between the holding pieces 33E and 34C and bottom plates 33A and 34A located on the lower side of the connecting busbar 21A.

Furthermore, a pair of engaging protruding sections 33F and a pair of engaging protruding sections 34D (that correspond to engaging sections) are provided projecting from opposing walls extending in the connection direction, of the partition walls 33B and 34B of the coupling section 33 and the coupled section 34. The engaging protruding sections 33F and 34D allow the connecting busbar 21A to move within a predetermined range in the connection direction by engaging with the engaged recess sections 23 of the connecting busbar 21A. That is, as shown in FIG. 2, a groove width a (width in the connection direction) of the engaged recess sections 23 of the connecting busbar 21A is slightly larger than the width dimension b in the connection direction of the engaging protruding sections 33F and 34D, and the difference a–b corresponds to a predetermined clearance, allowing the connecting busbar 21A to move in the connection direction over a range of a–b.

Each intermediate accommodating section 35 is constituted by a terminal holding section 35A that has a rectangular opening into which the flat plate section 26A of an intermediate voltage detection terminal 26 can be fitted from above, and an electrical wire through-groove 35B that accommodates the crimp section 26B and through which the voltage detecting electrical wire W2 crimped to the crimp section 26B can be led to the electrical wire routing groove 36. A pair of fitting protruding sections 37 having the shape of rods projecting rightward is provided at the right end of a group of four intermediate accommodating sections 35 that are line up laterally. The left end intermediate accommodating section 35C located leftmost of the four intermediate accommodating sections 35 has a pair of fitting recess sections 38 that are opened laterally and into which the fitting protruding sections 37 are fitted, the pair of fitting recess sections 38 being located with the terminal holding section 35A interposed therebetween in the front-rear direction.

Positioning Section

Figure 5:
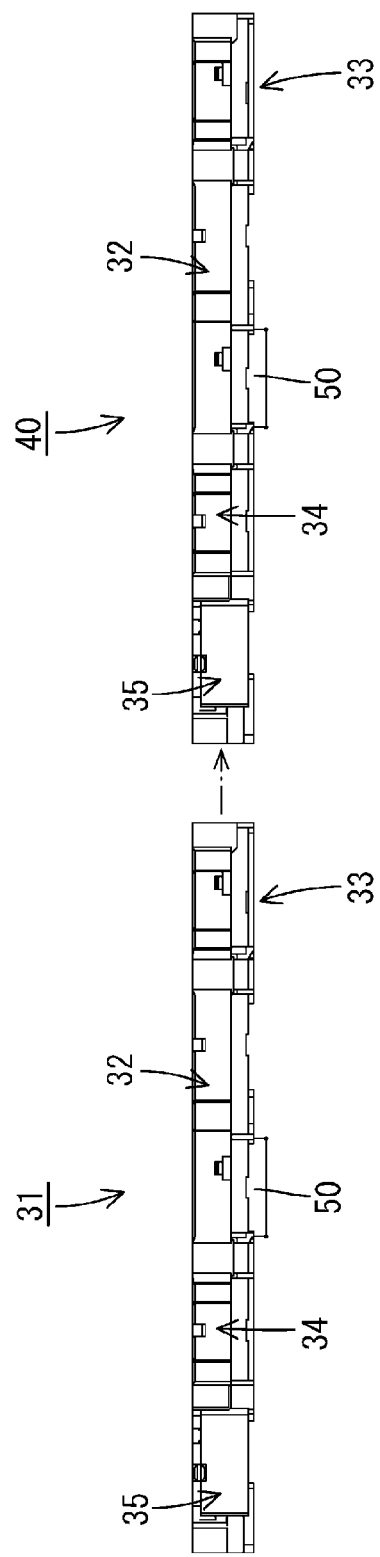
FIG. 5 is a side view showing the first unit and the second unit.

As shown in FIG. 5, each positioning section 50 is formed projecting downward from the lower end of a second intermediate accommodating section 35D located at the second place from the right, among the four intermediate accommodating sections 35 that are lined up laterally, and thus is located at a position that is the closest to the single cell 11 side among the components constituting the battery wiring module 20. That is, the positioning sections 50 are formed at positions in substantially the center of the first unit 31 and of the second unit 40 in the direction that intersects with the direction in which the single cells 11 are lined up. Each positioning section 50 has the shape of a recess into which the voltage detecting electrode section 14 of the corresponding single cell 11, together with the electrode holding section 14A, can be fitted. Note that in the present embodiment, the voltage detecting electrode section 14 and the electrode holding section 14A correspond to a positioned section.

Figure 6:
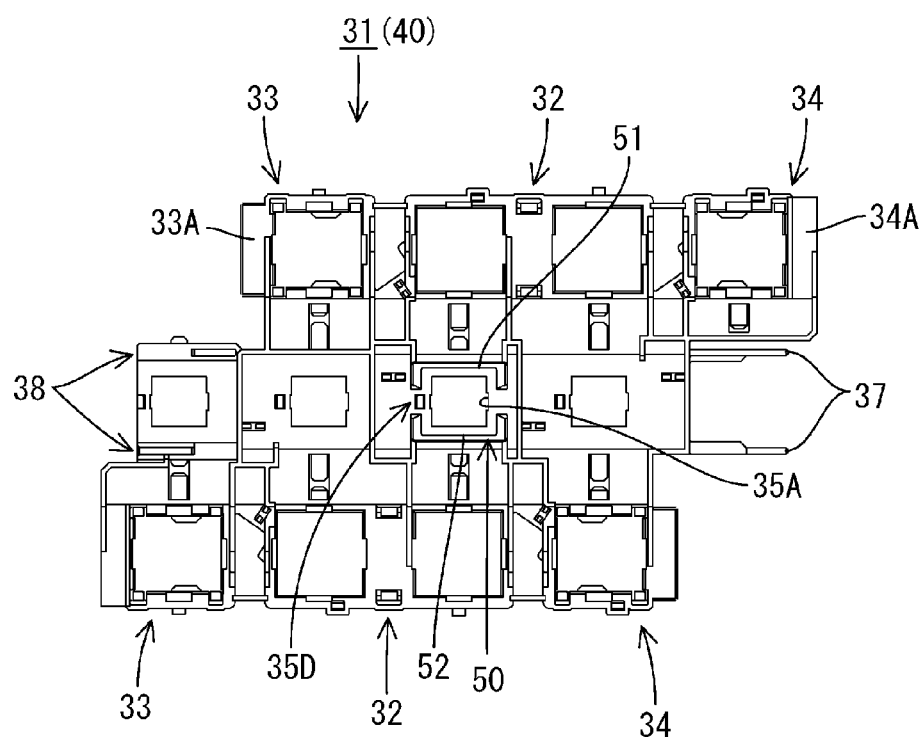
FIG. 6 is a bottom view of the first or second unit.

When the positioning section 50 is seen from the single cell 11 side (lower side), it is clear as shown in FIG. 6 that the positioning section 50 is constituted by a front surrounding wall section 51 that surrounds the front portion of the electrode holding section 14A along the side thereof and has the shape of a recess seen in plane view, and a rear surrounding wall section 52 that surrounds the rear portion of the same electrode holding section 14A along the side thereof and has the shape of a recess seen in the plane view. As shown in FIGS. 7 to 10, the front surrounding wall section 51 and the rear surrounding wall section 52 have, on their projecting ends, tapered inclined guide surfaces 51A and 52A that are inclined so as to enlarge the internal space of the positioning section 50 and formed circumferentially.

The following will describe a method for assembling the battery wiring module 20. First, the accommodation busbars 21B are accommodated in the accommodating sections 32 of the first unit 31 and the second unit 40. Then, one side of each connecting busbar 21A is laterally inserted, in the connection direction, into one of the coupling section 33 and coupled section 34 that are associated with each other when the first unit 31 and the second unit 40 are coupled to each other so that the connecting busbar 21A is held, and the other side of the connecting busbar 21A is laterally inserted into the other one in the connection direction, and at the same time, the fitting protruding sections 37 are inserted into the corresponding fitting recess sections 38, and are fitted to each other at positions at which the bottom plates 33A and the bottom plates 34A of the corresponding coupled sections 34 are overlapped one above the other, and thereby the coupling operation is completed.

The flat plate sections of the voltage detection terminals 25 are fitted into the terminal holding sections 32D over the busbars 21 accommodated in the respective accommodating sections 32, and the voltage detecting electrical wires W1 crimped to the voltage detection terminals 25 are led from the electrical wire through-grooves 32E to the electrical wire routing groove 36. Furthermore, the flat plate sections 26A of the intermediate voltage detection terminals 26 are fitted into the terminal holding sections 35A of the intermediate accommodating sections 35, and the voltage detecting electrical wires W2 crimped to the intermediate voltage detection terminals 26 are led from the electrical wire through-grooves 35B to the electrical wire routing groove 36.

In the battery wiring module 20 that is assembled in the above-described manner, the numbers of the first units 31 and the second units 40 that are coupled to each other are decided depending on the number of the single cells 11 constituting the single cell group. Incidentally, a clearance a−b is ensured between the groove width a of the engaged recess sections 23 of the connecting busbar 21A for coupling the first unit 31 and the second unit 40, and the width dimension b in the connection direction of the engaging protruding sections 33F and 34D of the coupling section 33 and the coupled section 34 that are engaged with the engaged recess sections 23. Therefore, the battery wiring module 20 is extendable in the connection direction so as to have the maximum length that is obtained by multiplying 2×(a−b), which is the extension width in the coupling direction in which the coupling sections 33 and the coupled sections 34 are coupled to each other, with the number of the connecting busbars 21A that are arranged in series in the connection direction in which the first unit 31 and the second unit 40 are connected to each other. Note that since the fitting protruding sections 37 are only inserted into the fitting recess sections 38, it is decided how deep the fitting protruding sections 37 are inserted into the fitting recess sections 38 in the connection direction, based on the positional relationship between the coupling sections 33 and the corresponding coupled sections 34.

Figure 7:
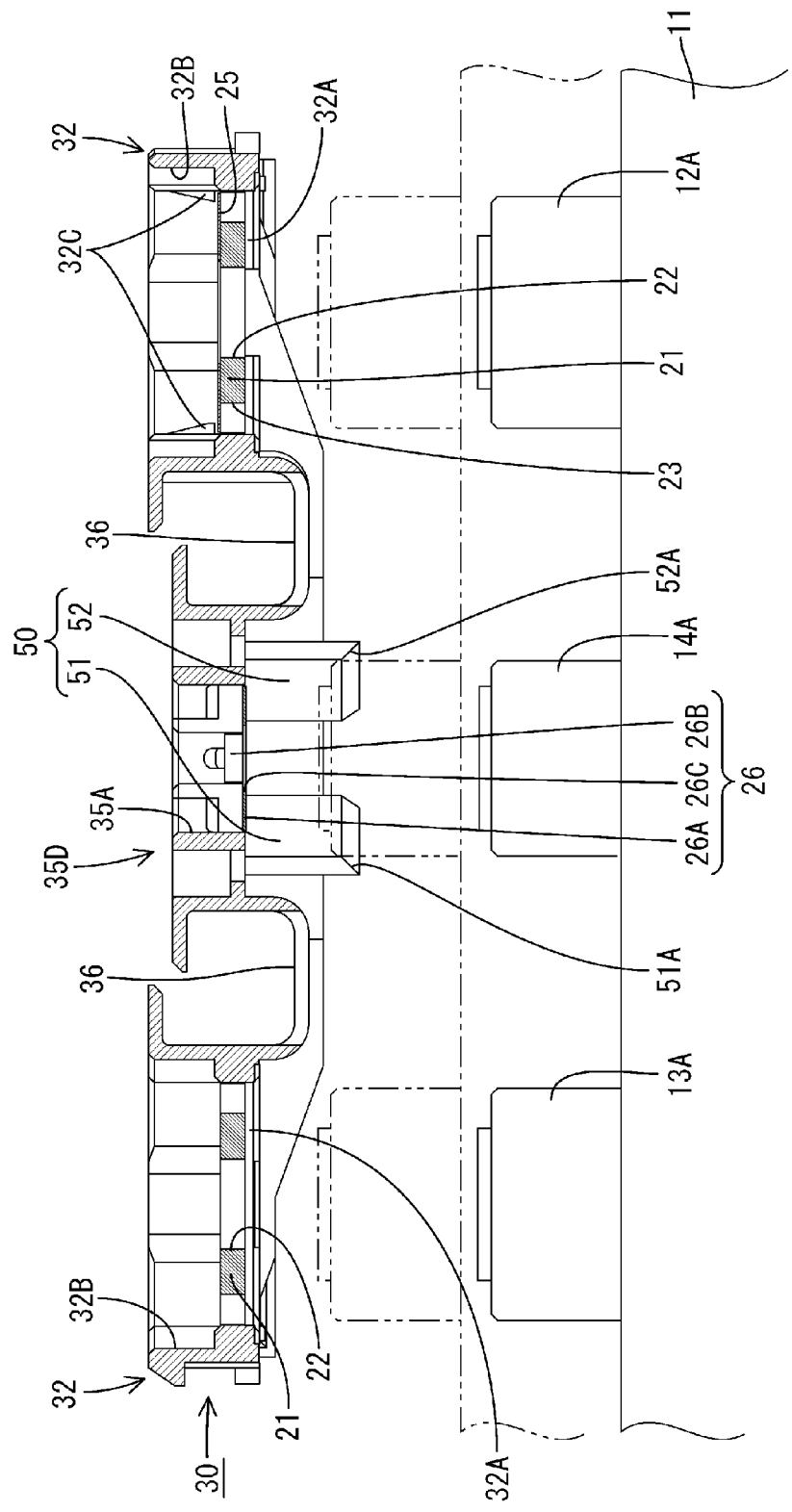
FIG. 7 is a cross-sectional view taken along the line A-A of FIG. 2.
Figure 8:
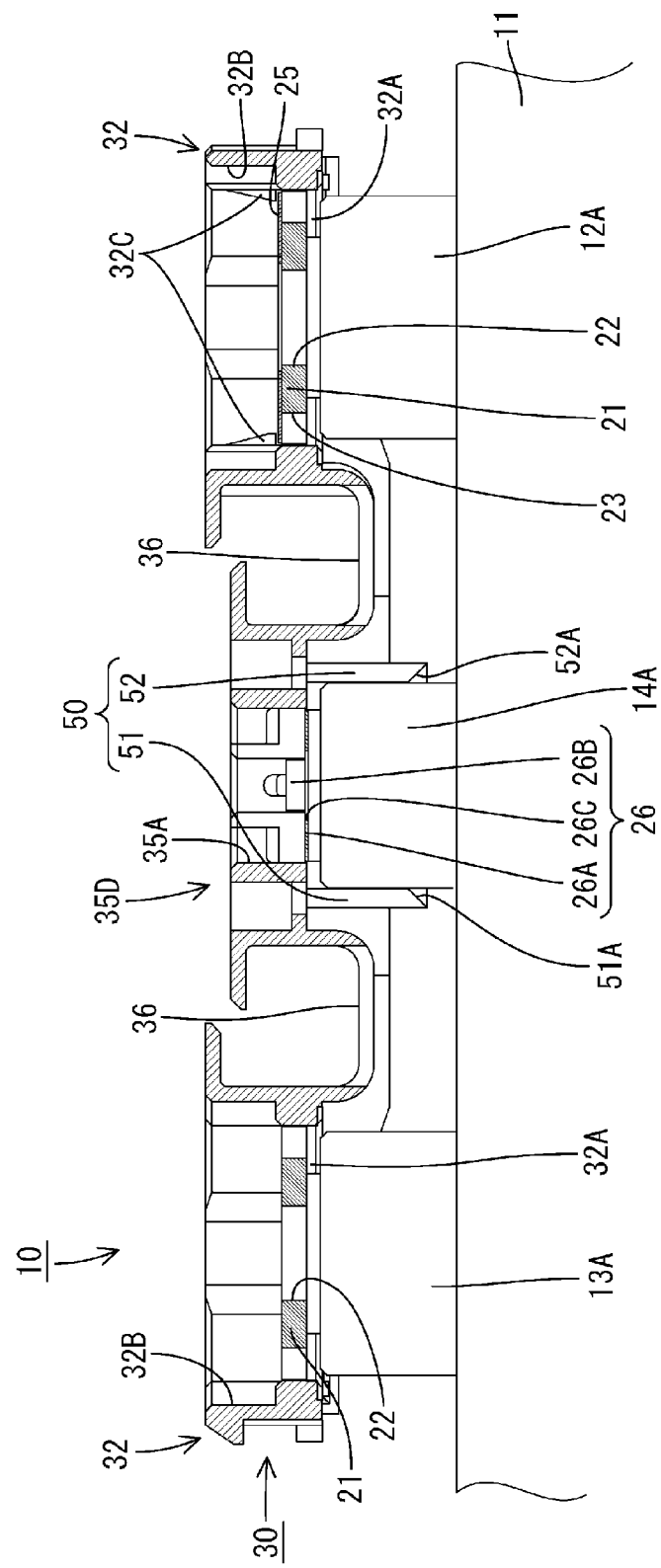
FIG. 8 is a partial cross-sectional view of FIG. 7 showing the state in which the battery wiring module is attached to a single cell group.
Figure 9:
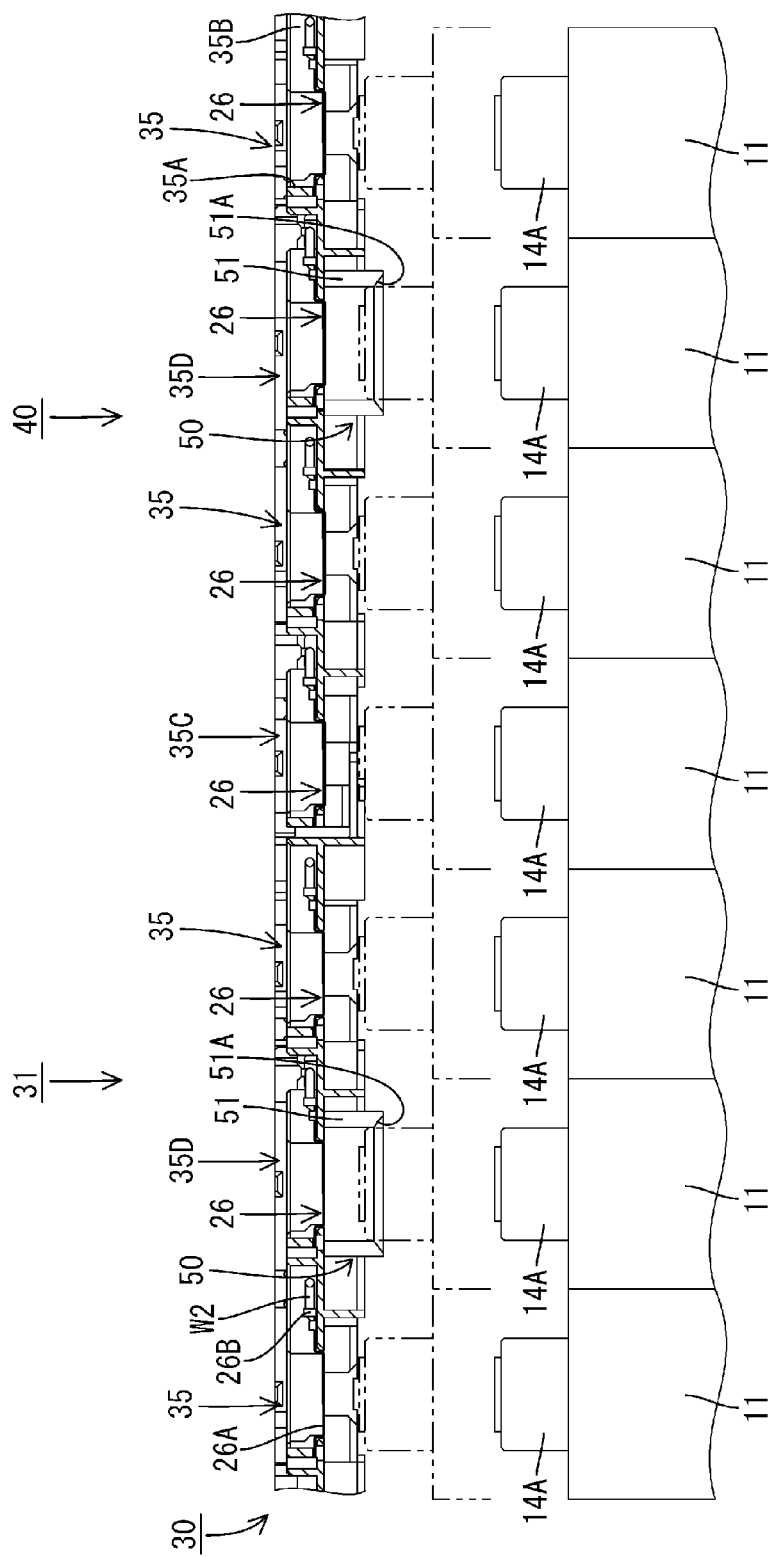
FIG. 9 is a cross-sectional view taken along the line B-B of FIG. 2.
Figure 10:
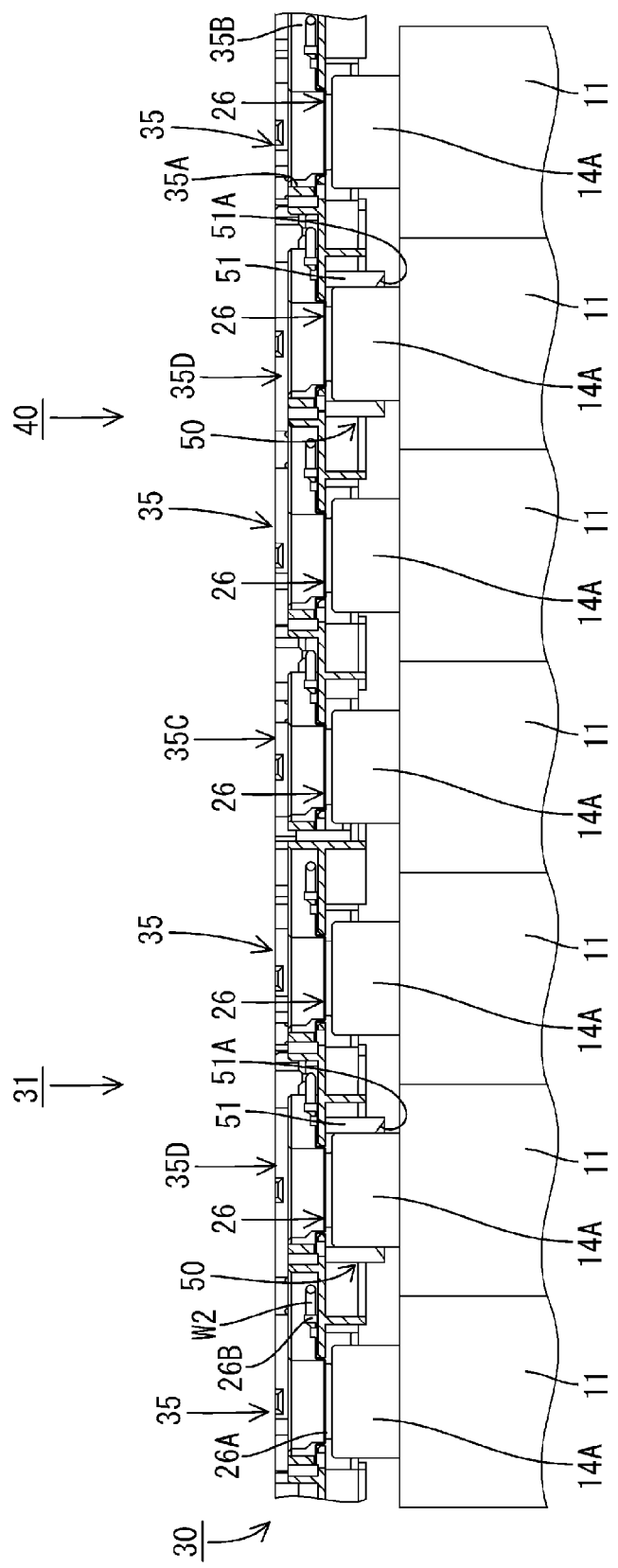
FIG. 10 is a partial cross-sectional view of FIG. 9 showing the state in which the battery wiring module is attached to the single cell group.

The following will describe a method for assembling the battery wiring module 20 to the single cell group. As shown in FIGS. 7 and 9, the battery wiring module 20 is positioned so that the second intermediate accommodating sections 35D that are provided on the first unit 31 and the second unit 40 are located directly above the corresponding voltage detecting electrode sections 14. Then, the positioning sections 50 that are provided projecting from the lower sections of the second intermediate accommodating sections 35D are overlaid on the electrode holding sections 14A in the surrounding of the electrode sections 14, and are fitted thereto. At that time, since the positioning sections 50 project farther downward to the single cell 11 side than any other sections of the protector 30, positioning of the positioning sections 50 on the electrode sections 14 that serves as references is easy.

Then, the battery wiring module 20 is assembled based on the positioning sections 50 that are fitted to the electrode sections 14 and the electrode holding sections 14A that correspond to positioned sections. That is, since the battery wiring module 20 is extendable in the connection direction as described above, positioning is performed so that the through-holes 22 of the busbars 21 and the insertion through-holes of the voltage detection terminals 25 that communicates with the through-holes 22, or the insertion through-holes 26C of the intermediate voltage detection terminals 26 are aligned with the screw holes of the electrode sections 12, 13, and 14 (see FIGS. 8 and 10). Accordingly, the extendable configuration of the battery wiring module 20 makes it possible to eliminate a dimension error among the electrode sections 12, 13, and 14 of the single cell 11, resulting in an easy assembling operation.

Then, the shafts of bolts (not shown) are inserted into the through-holes 22 and the insertion through-holes of the voltage detection terminals 25 that communicate with the through-holes 22, or the insertion through-holes 26C of the intermediate voltage detection terminals 26 that overlap the electrode sections 12, 13, and 14, and are bolt-tightened by being screwed into the screw holes of the electrode sections 12, 13, and 14 with the thread grooves of the bolts. Accordingly, the corresponding electrode sections 12 and 13 and the voltage detection terminals 25 are electrically connected to each other via the busbars 21, and the voltage detecting electrode sections 14 and the intermediate voltage detection terminals 26 are electrically connected to each other. Note that since the through-holes 22 of the busbar 21 and the insertion through-hole of the voltage detection terminal 25, and the insertion through-hole 26C of the intermediate voltage detection terminal 26 have the shape of a long oval extending in the right-left direction, it is possible to not only eliminate a dimension error among the electrode sections 12, 13, and 14 due to the above-described extendable configuration of the battery wiring module 20, but also ensure a sufficient space into which a bolt can be inserted, allowing reliable bolt-tightening. By assembling the battery wiring module 20 to the single cell group in the above-described manner, assembling of the battery module 10 is completed.

As described above, according to the present embodiment, it is possible to improve workability of assembling the battery wiring module 20 to the single cell group. That is, since the battery wiring module 20 is positioned with respect to the single cells 11 using the positioning sections 50, and the voltage detecting electrode sections 14 and the surrounding electrode holding sections 14A that correspond to the positioned sections, and then the busbars 21 and the electrode sections 12 and 13 can be connected to each other, the troublesome operation of positioning each busbar 21 with respect to the corresponding electrode sections 12 and 13 does not need to be performed. Particularly, when the number of the single cells 11 constituting the single cell group is large, a significant improvement in work efficiency is possible. Furthermore, since the protector 30 includes the positioning sections 50, and grove positioning is performed by fitting in advance the positioning sections 50 to the electrode sections 14 and the surrounding electrode holding sections 14A, and then the remaining electrode sections 12 and 13 are connected to the busbars 21, it is not necessary to bring the busbars 21 into contact with the electrode sections 12 and 13 multiple times when performing attachment operation, making it possible to reduce the risk that the busbars 21 and the electrode sections 12 and 13 are damaged and the performance of the battery module 10 deteriorates, for example.

Furthermore, by the voltage detecting electrode section 14 and the surrounding electrode holding section 14A that are provided on the same single cell 11 as that of the electrode sections 12 and 13 that need to be subjected to positioning serving as the positioned sections, it is possible to reduce the error in assembling of the busbars 21 with respect to the electrode sections 12 and 13 after the electrode sections 14 and the electrode holding sections 14A, and the positioning sections 50 are fitted to each other, preventing deterioration in assembling workability that may be caused due to an increase in the error in assembling.

Furthermore, since the positioning sections 50 are provided projecting farther to the single cell 11 side than the busbars 21, the battery wiring module 20 can be configured such that the positioning sections 50 are first fitted to the voltage detecting electrode sections 14 and the electrode holding sections 14A when the battery wiring module 20 is attached to the single cells 11, irrespective of the configuration of the single cells 11, and thus is excellent in versatility.

Furthermore, since the positioning sections 50 are formed at substantially central positions of the protector 30 in the direction that intersects with the direction in which the single cells 11 are lined up, it is possible to reduce the error in assembling the protector 30 to the single cells 11 as compared with the case where the positioning sections 50 are provided at, for example, any one end in the same direction, resulting in easier positioning of the busbars 21 with respect to the electrode sections 12 and 13.

Furthermore, the positioned sections are the voltage detecting electrode section 14 and the electrode holding section 14A that are provided between the positive and negative electrode sections 12 and 13 of one single cell 11, and the positioning section 50 has the shape of a recess into which the voltage detecting electrode section 14 and the electrode holding section 14A can be fitted. Accordingly, since the distance from the electrode section 14 and the electrode holding section 14A to the positive electrode section 12 (13) is made substantially equal to the distance from the electrode section 14 and the electrode holding section 14A to the negative electrode section 13 (12), an error in assembling the busbars 21 to the electrode sections 12 and 13 after the positioning sections 50 are fitted to the electrode sections 14 and the electrode holding sections 14A can be suppressed in a balanced manner, making it possible to improve the assembling workability.

Furthermore, by the voltage detecting electrode section 14 and the surrounding electrode holding section 14A serving as the positioned sections, the need to provide a positioned section, separately from the voltage detecting electrode section 14, on the single cell 11 side is eliminated, making it possible to achieve excellent versatility and a reduction in cost. Additionally, since the voltage detecting electrode section 14 and the electrode sections 12 and 13 are managed with respect to accuracy in size by the single cells 11, irrespective of the positioning sections 50, it is not necessary to newly manage accuracy in size of the positioned section (separately from the voltage detecting electrode section 14). Also, an error in assembling the busbars 21 to the electrode sections 12 and 13 is further reduced by fitting the positioning sections 50 to the voltage detecting electrode sections 14 that has been subjected to the size accuracy management, allowing a further improvement in assembling workability.

Furthermore, since the positioning section 50 has, on its projecting end, the inclined guide surfaces 51A and 52A that are inclined so as to enlarge the internal space of the positioning section 50 and formed circumferentially, the electrode sections 14 and the electrode holding sections 14A can easily be guided by the inclined guide surfaces 51A and 52A when the positioning section 50 is fitted to the voltage detecting electrode section 14 and the electrode holding section 14A, which are the positioned sections. Therefore, by improving the workability of fitting the positioning sections 50 to the electrode sections 14 and the electrode holding sections 14A, it is possible to improve the workability of assembling the entire battery wiring module 20.

Furthermore, since, even when an assembling error occurs between the plurality of single cells 11 and the battery wiring module 20 that is assembled thereto, at least one of the first unit 31 and the second unit 40 is configured to be slidably movable with respect to the busbars 21 in the connection direction of the busbars 21, and thus it is possible to vary the relative position of the first unit 31 and the second unit 40 via the busbars 21 based on the voltage detecting electrode sections 14 and the electrode holding sections 14A of the counterpart single cells 11. Therefore, the error in assembling to the single cell 11 can be eliminated on the battery wiring module 20 side, and a defect in assembling the battery wiring module 20 that may be caused due to the dimensional error between both the components can be prevented.

Furthermore, since the busbar 21 is provided with the engaged recess sections 23, and at least one of the first unit 31 and the second unit 40 is provided with the engaging protruding sections 33F and 34D that are engageable with the engaged recess section 23 with a predetermined clearance a–b in the connection direction, the busbars 21 can move slidably in the range of the clearance a–b when the positioning sections 50 are fitted to the voltage detecting electrode sections 14 and the electrode holding sections 14A, which are the positioned sections. Therefore, even when an error in dimension between the electrode sections 12 and 13 occurs, each busbar 21 can be moved in the range of the clearance a–b in the connection direction, making an improvement in the assembling workability of the busbars 21 to the electrode sections 12 and 13 possible.

Other Embodiments

The embodiment that has been described with reference to the drawings, and the technical scope includes the following embodiments, for example.

(1) Although in the above-described embodiment, the positioning section 50 is provided on each of the first unit 31 and the second unit 40, the exemplary embodiment is not limited to this, and a positioned section may also be provided on each single cell, and corresponding positioning sections may also be provided on each unit. With such a configuration, it is possible to perform positioning for each single cell, suppressing an error in assembling the connecting members to the electrode sections to the minimum. That is, the closer the formation position of the positioning section to the connecting members to be positioned is, the more the error in assembling the connecting members to the electrode sections can be suppressed to be small. Therefore, by providing a positioning section for each single cell, which is a minimum unit, it is possible to suppress the assembling error and improve the assembling workability.

(2) Although in the above-described embodiment, the positioning sections 50 are formed at substantially central positions of the protector 30 in the direction that intersects with the direction in which the single cells 11 are lined up, the present embodiment is not limited to this, and encompasses a configuration in which the positioning sections are formed at an end in the direction that intersects with the direction in which the single cells 11 are lined up.

(3) Although in the above-described embodiment, the positioning section 50 has, on its projecting end, the inclined guide surfaces 51A and 52A, the present embodiment is not limited to this, and the inclined guide surfaces may not be provided, and rather marks for positioning the positioning sections to the positioned sections may be formed. By providing not only the positioning sections and the positioned sections, but also measures for facilitating fitting of the positioning sections to the positioned sections, it is possible to further improve workability of assembling the battery wiring module to the single cells.

(4) Although in the above-described embodiment, the engaging protruding sections 33F and 34D that engage with the engaged recess sections 23 are provided on both the first unit 31 and the second unit 40, the present embodiment is not limited to this, and the engaging sections may also be provided on any one of the first unit and the second unit. Even by such a configuration, a clearance between the engaging sections of at least one unit and the engaged sections of the connecting member can prevent a defect when the battery wiring module is attached.

(5) Although in the above-described embodiment, the engaged recess sections 23 and the engaging protruding sections 33F and 34D are provided, the present embodiment is not limited to this, and a configuration is also possible in which, for example, the engaged sections and the engaging sections are not provided, and the connecting members are configured to be slidably movable with respect to the units (irrespective of the clearance).

(6) Although in the above-described embodiment, a configuration is employed in which the electrode sections 12, 13, and 14 of the single cell 11 have the shape of a nut, and are tightened by bolts that are separate members, the present embodiment is not limited to this, and a configuration is also possible in which the electrode sections have rod-shaped shafts having thread grooves on their circumference, and the connecting members are fixed to the terminal sections by being tightened with nuts that are separate members. In this case, the shafts of the electrode sections are inserted through the through-holes of the connecting members.

(7) Although the above-described embodiment has described the case where a plurality of single cells 11 are connected to each other in series, the present embodiment is not limited to this, and an embodiment may also be applied to the case where the plurality of single cells are connected to each other in parallel.

(8) In the above-described embodiment, the number of the single cells 11 constituting the battery module 10 is not limited to the number mentioned in the above-described embodiment. Furthermore, the battery wiring module 20 may have any shape according to the number of the single cells 11.

(9) Although the above-described embodiment has described an example in which the busbars 21 serve as the connecting members, the present embodiment is not limited to this, and it is sufficient that the connecting members are electrically connectable members, and may be, for example, electrical wires, flexible printed substrate (FPC) or the like.

LIST OF REFERENCE NUMERALS

10 . . . Battery wiring module
11 . . . Single cell
12, 13 . . . Electrode section
12A, 13A, 14A . . . Electrode holding section
14 . . . Voltage detecting electrode section
20 . . . Battery wiring module
21 . . . Busbar (connecting member)
21A . . . Connecting busbar
21B . . . Accommodation busbar
22 . . . Through-hole
23 . . . Engaged recess section (engaged section)
25 . . . Voltage detection terminal
26 . . . Intermediate voltage detection terminal
30 . . . Protector
31 . . . First unit
33F, 34D . . . Engaging protruding section (engaging section)
37 . . . Fitting protruding section
38 . . . Fitting recess section
40 . . . Second unit
50 . . . Positioning section
51A, 52A . . . Inclined guide surface

The invention claimed is:

1. A battery wiring module configured to be attached to a single cell group in which a plurality of single cells each having a positive electrode section and a negative electrode section are lined up, and to connect the electrode sections to each other, the battery wiring module comprising:
   connecting members configured to connect the electrode sections to each other;
   a voltage detecting electrode section positioned between a positive electrode section and a negative electrode section of each single cell; and
   a protector holding the connecting members, the protector including:
   a positioning section fitted to the voltage detecting electrode section formed in a single cell prior to connecting the connecting members to the electrode sections when the battery wiring module is attached to each single cell, the positioning section projects further on a bottom side of the battery wiring module than the connecting members, and the positioning section has a shape of a recess into which the voltage detecting electrode section can be fitted.

2. The battery wiring module according to claim 1, wherein the positioning section is disposed at a position that is closer to the single cell side when the battery wiring module is attached to the single cells.

3. The battery wiring module according to claim 1, wherein the positioning section is formed at a substantially central position of the protector in a direction that intersects with a direction in which the single cells are arranged.

4. The battery wiring module according to claim 1, wherein the protector has the positioning section for each of the single cells.

5. The battery wiring module according to claim 1, wherein the positioning section has a projecting end at which an inclined guide surface is disposed, the inclined guide surface is inclined so as to enlarge an internal space of the positioning section, the inclined guide surface being provided circumferentially with respect to the projecting end of the positioning section.

6. The battery wiring module according to claim 1, wherein
   the connecting members connect adjacent electrode sections of the plurality of single cells,
   the protector includes a first unit that holds one side in a connection direction of each connecting member, and a second unit that holds the other side in the connection direction of the connecting member, and
   at least one of the first unit and the second unit is configured to be slidably movable with respect to the connecting members in the connection direction of the connecting members.

7. The battery wiring module according to claim 6, wherein the connecting member includes an engaged section, and at least one of the first unit and the second unit includes an engaging section that engages with the engaged section in the connection direction with a predetermined clearance.

\* \* \* \* \*